CHARACTER RECOGNITION SYSTEMS AND APPARATUS

Filed Nov. 27, 1964 4 Sheets-Sheet 1

INVENTORS
Maxwell Bernard Clowes
John Ronald Parks
David Oswald Clayden
By Cushman, Darby & Cushman
ATTORNEYS

CHARACTER RECOGNITION SYSTEMS AND APPARATUS

Filed Nov. 27, 1964

4 Sheets-Sheet 2

INVENTORS
Maxwell Bernard Clowes
John Ronald Parks
David Oswald Clayden
By Cushman, Darby & Cushman
ATTORNEYS March 7, 1967 M. B. CLOWES ETAL 3,308,430

CHARACTER RECOGNITION SYSTEMS AND APPARATUS

Filed Nov. 27, 1964 4 Sheets-Sheet 3

INVENTORS
Maxwell Bernard Clowes
John Ronald Parks
David Oswald Clayden
By Cushman, Darby & Cushman
ATTORNEYS INVENTORS
Maxwell Bernard Clowes
John Ronald Parks
David Oswald Clayden
By Cushman, Darby & Cushman
ATTORNEYS United States Patent Office 3,308,430

Patented Mar. 7, 1967

3,308,430

CHARACTER RECOGNITION SYSTEMS AND APPARATUS

Maxwell Bernard Clowes, Oxford, and John Ronald Parks and David Oswald Clayden, Teddington, Middlesex, England, assignors to National Research Development Corporation, London, England, a British corporation Filed Nov. 27, 1964, Ser. No. 414,247
Claims priority, application Great Britain, Nov. 29, 1963, 47,289/63
14 Claims. (Cl. 340—146.3)

This invention relates to systems and apparatus for recognising printed or hand written characters by so-called "auto-correlation" or comparison methods such as those described in U.S.A. Patent No. 3,196,395, filed May 15, 1961, by M. B. Clowes and J. R. Parks for character recognition systems and arrangements and U.S.A. patent application Serial No. 327,196, filed December 2, 1963 for character recognition systems and arrangements by J. R. Parks, or similar comparison or matching methods.

One object of the present invention is the provision of improved methods of and apparatus for recognising printed or hand-written characters having enhanced accuracy and increased speed of operation.

Another object of the invention is the provision of methods of and apparatus or recognising printed or hand-written characters capable of dealing simultaneously and collectively with a plurality of different characters such as those of a complete word.

Broadly in accordance with the present invention a number of different self-matching operations are performed on each character, or, more preferably, on each of a group of characters constituting a text word, to determine the presence or absence of a specific character feature therein, the results of such feature-determining operations are separately registered whereafter a second series of matching operations are performed using different combinations of the registered results of the first series of operations to determine the presence or absence of specific feature combinations therein and the results of such further operations again separately registered whereafter, by selective examination of the registered results of the second set of operations, identification of the character or of each of the successive characters of the group is effected by determining which of said second operation result registrations show a response in excess of a chosen threshold value.

The system may be operated on a purely optical basis with each result registered photographically but, in view of the relatively long time factor involved by such method, use is preferably made of equivalent electronic arrangements such as those employing photo-storage tubes of the type broadly described in the aforesaid co-pending application Serial No. 327,196 or employing signal delay lines with associated coincidence gate examination of a plurality of separate and differently delayed electric signal outputs from such delay lines. A further alternative system employing electronic methods is one utilising magnetic or dielectric hysteresis type storage devices with selective reading of different ones of a matrix of such devices by appropriately arranged separate read conductors.

In order that the nature of the invention may be better understood a number of different arrangements embodying the invention will now be described by way of illustrative example only and with reference to the accompanying drawings wherein:

FIGURE 1 is a largely schematic diagram illustrating the basic principle of the invention by utilisation of an optical method of operation.

FIGURE 2 comprises a series of elevational views of certain image-bearing layers of the intermediate description matrix of the optical arrangements shown in FIG. 1.

FIGURE 3 comprises a further series of elevational views of certain image-bearing layers of the character description matrix of the optical arrangements shown in FIG. 1.

FIGURES 9 and 10 are diagrams illustrating further modifications, while

Figure 1:
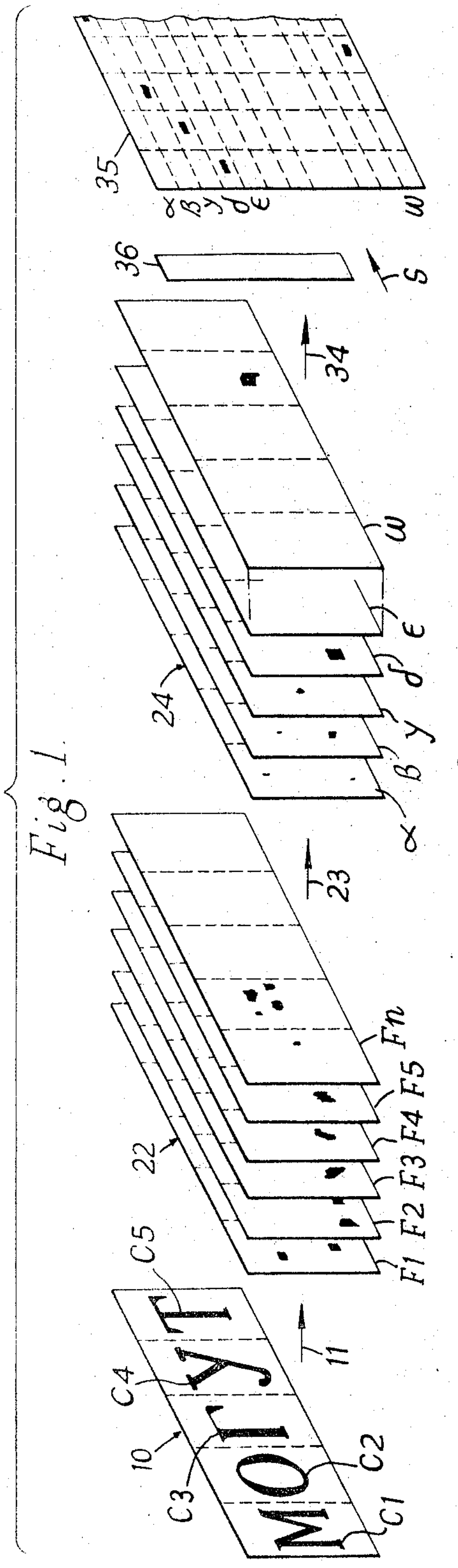
Figure 4:
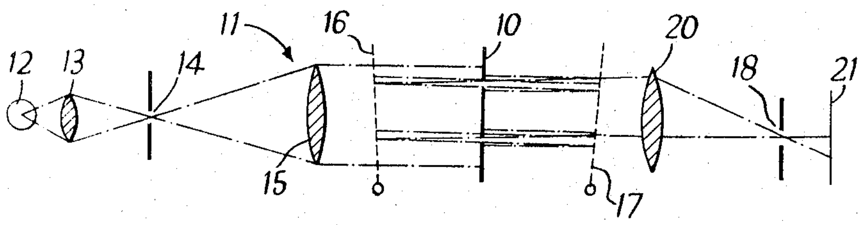
FIGURE 4 is a largely schematic diagram showing one simple form of means for effecting self-matching examination of the object characters to produce the image-bearing layers of the intermediate description matrix as shown in FIG. 2.

Referring first to FIG. 1 which is used to explain the basic principle utilising purely optical methods, a group of object characters shown at 10, for instance, a printed word, is subjected to a series of different forms of so-called self-matching examination of each of its component characters C1, C2, C3, C4 and C5 by means which are indicated schematically by the arrow 11. Such self-matching means 11 may be of any suitable form and may resemble those referred to in the aforementioned U.S.A. Patent No. 3,196,395 but in which an output in the form of an optical image recording is obtained instead of an electric signal output as described in said patent. Such an optical image recording may be obtained by dispensing with the photocell or photocells and arranging to project the light previously incident upon at least one of such photocells (chosen according to the number of self-matching operations required) as an image upon a suitable photographic film or plate. For the sake of completeness and ease of understanding one simplified form of such means is illustrated in FIG. 4 of the accompanying drawings. This figure is broadly similar to that of FIG. 11 of the aforementioned U.S.A. Patent No. 3,196,395 but without the means for rotating the character-bearing element and without the photocells. It comprises a light source 12, a condensing lens system 13 and a pinhole aperture 14 in an opaque screen for producing a point light source at such aperture. Light from this source is arranged to form a parallel beam and to illuminate the character group 10 (see FIG. 1), which is in the form of transparent character areas in an otherwise opaque layer, through a collimating lens 15 and a first beam splitter 16, which latter may be a half-silvered mirror. Light passing through the character-shaped zones of the group 10 forms a first image or character copy and this is, in part, reflected back on to the character group 10 by means of a second beam splitter 17. Any part of this reflected, character shaped, beam which re-passes the character group 10 to form a second image consisting only of those parts of the first image which overlap the original zones of the group 10 is incident on the first beam splitter 16 and is again in part reflected back by such first beam-splitter 16 on to the character group 10 and that part which again passes through such group to form a third image consisting only of those parts of the second image which overlap the original zones of the group 10 is again incident on the second beam splitter 17. Each of the beam splitters 16, 17 is universally adjustable in its angular tilt position relative to the axis of the parallel light beam from the point source 14 and collimating lens system 15 whereby the first and second image versions of the character group 10 which are incident upon the latter after reflection respectively by the second and first beam splitters 17, 16 are suitably displaced in accordance with the desired form of self-matching examination as will be referred to in greater detail later with reference to FIG. 2. A part of the third character image beam which is again incident on the beam splitter 17 after again re-passing the group 10 is transmitted by the said beam splitter 17 and may be brought to focus at a stop aperture 18 by a lens system 20 and from thence imaged on a photographic film or plate layer 21. The latter, after development and suitable further treatment as desired to produce either a negative or a positive image, forms a registration of the result obtained by one form of self-matching examination of the character group. Other similar examinations, but with different inclinations of the beam splitter mirrors 16, 17, are performed and registered in like manner.

Figure 2:
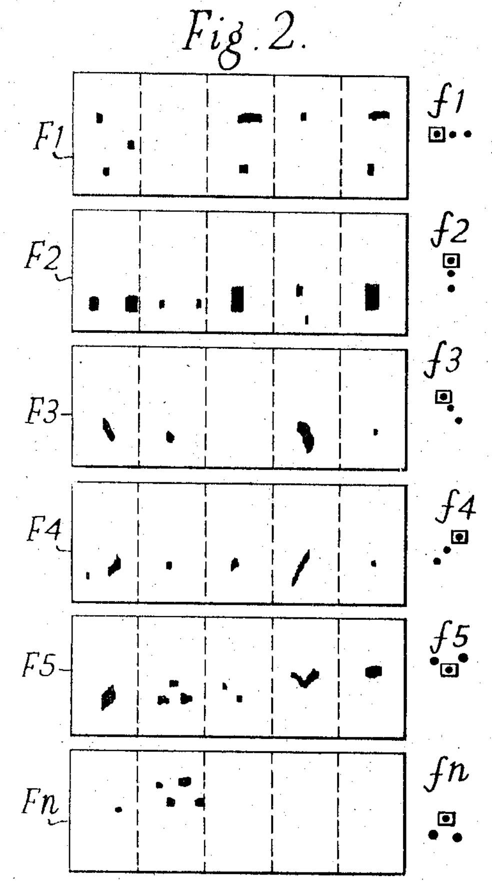

The result from each examination, thus registered as at least one optical image, forms a unique area part of an information store referred to hereafter as an intermediate description matrix 22. This matrix is shown, purely for convenience, as a series of stacked image-bearing layers F1, F2, F3 . . . F*n* each of which may be one of the photographic films 21 obtained as described above. It will be understood that the recording made on each layer might be, for example, as one or more transparent zones in an otherwise opaque field with the size and position of such zones determined by the regions of multiple overlap arising during the related self-matching operation. Each layer has different regions thereof related one to each of the separate characters C1, C2, C3 . . . of the group 10. In the drawing of FIGS. 1 and 2 both the character group area 10 and the image-layers F1, F2 . . . are shown divided by dotted lines into unit character regions but this is for convenience of explanation only as the number of such regions would alter automatically with change of the present character group.

The type of self-matching operation performed while recording on each of the separate image layers F1, F2 . . . F*n* will be different and chosen to detect a particular character feature such as a horizontal limb, or a vertical limb or a sloping limb to left or right and so on. Thus as shown in FIG. 2, which illustrates typical forms of the layers F1, F2 . . . F*n* for the characters C1, C2 . . . C5 of the group 10, the self-matching operation registered on layer F1 was one involving horizontal displacement of the first and second images of the character group relative to the original character group 10 as indicated symbolically at *f*1 to detect horizontal components of the examined characters. The dot mark enclosed within a square denotes the original object group 10 and the two further dots mark respectively the relative positions of the displaced first and second images during the self-examination process already referred to in connection with FIG. 4. Thus substantial area recordings are present in the upper half of the third and fifth character areas of the image layer F1 due to the presence of such a horizontal component in the upper part of each of the characters C3 and C5. It will be observed that there are no recording areas of any appreciable size in any of the other, first, second and fourth characters.

The form of the self-matching operation for the other layers F2, F3 . . . F*n* can be seen from the associated symbols *f*2, *f*3 . . . *fn*. Thus layer F2 registers the results obtained when the first and second images of the character group are each displaced vertically with respect to the group 10 and indicates the detection of substantial vertical limb components in character C1, C3 and C5 while the layer F3 registers the results obtained when the first and second images of the character group are each displaced downwardly at an inclination from left to right with respect to the group 10 and indicates the detection of downward sloping left to right components in characters C1 and C4. In similar manner the layer F4 indicates the detection of downward sloping right to left components in characters C1, and C4, the layer F5 indicates the detection of approximately V or downwardly convex arcuate shaped components in characters C1, C2 and C4 and layer F*n* indicates the detection of an inverted —V or upwardly convex arcuate shaped component in character C2 only. In practice a much greater number of different self-matching forms than the six examples shown are employed.

Figure 3:
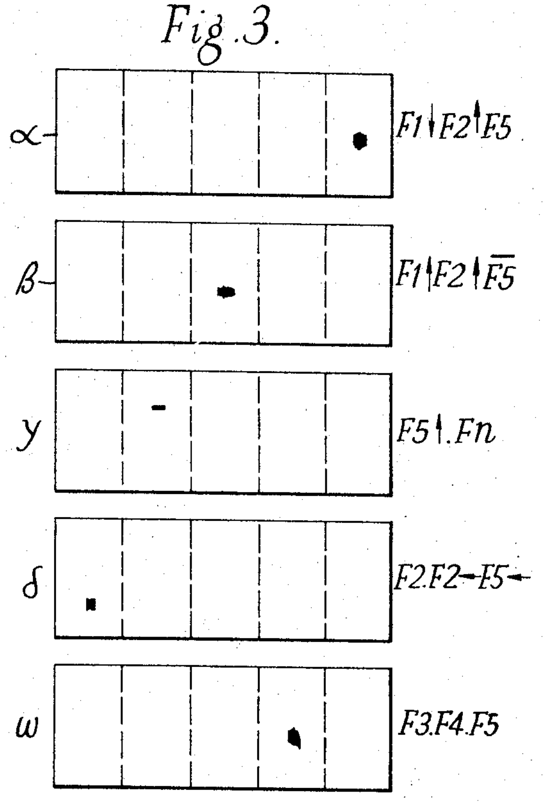

The separate result recordings on the different image layers F1, F2 . . . F*n* of the intermediate description matrix 22 (hereinafter for brevity referred to as the ID matrix) are then employed in different combinations to perform a second series of matching or comparison operations by suitable matching operation means indicated schematically by the arrow 23, FIG. 1, and the results obtained from each of these further matching operations are each registered as an optical image within a unique area of a character description matrix 24 (hereinafter referred to, for brevity, as the CD matrix). This character description matrix is again shown, purely for convenience, as a series of stacked image-bearing layers $\alpha$, $\beta$, $\gamma$, $\delta$, $\epsilon$ . . . $\omega$. The choice of the selected I.D. matrix image layers F1, F2 . . . F*n* employed for each matching or comparison operation and any relative shift of position therebetween during the performance of such operation is determined by the combination of features present in each character sought to be recognized and their positional relationship in such character. Thus, in FIG. 3, which illustrates typical forms of certain layers of the CD matrix 24, the layer $\alpha$ depicts the result of comparison of the I.D. matrix layer F5 with the F1 layer displaced vertically downwards with respect thereto and with the I.D. matrix layer F2 shifted vertically upwards with respect to such I.D. matrix layer F5. Such comparison or matching operation effectively establishes the simultaneous presence of a horizontal component at the top of the character, a vertical component and a V-shaped component indicative that the vertical meets the horizontal intermediate the ends of the latter and from below. Such feature combination is accordingly characteristic of the letter T and any appreciable result registration obtained in such layer can be regarded as indicative of the presence in the original character group 10 of the letter T which forms the character C5. The other layers $\beta$ . . . $\omega$ shown in FIG. 3 operate in similar manner to register the results of other comparison or matching operations chosen to detect the presence of the remaining characters of the group 10. The effect of the inverse or NOT function (for detecting specific absence of a feature) shown for layer F5 in layer $\beta$ of FIG. 3 may be obtained by using an image layer in which the recordings are of positive image form, i.e. opaque areas on a transparent background or field.

The number of CD matrix areas or layers is at least equal to the number of different characters sought to be recognised. More than one comparison or matching operation of this second series may be registered in one of the layers, $\alpha$ . . . $\omega$ as a result of more than one type of feature combination being applicable to a particular character.

Figure 5:
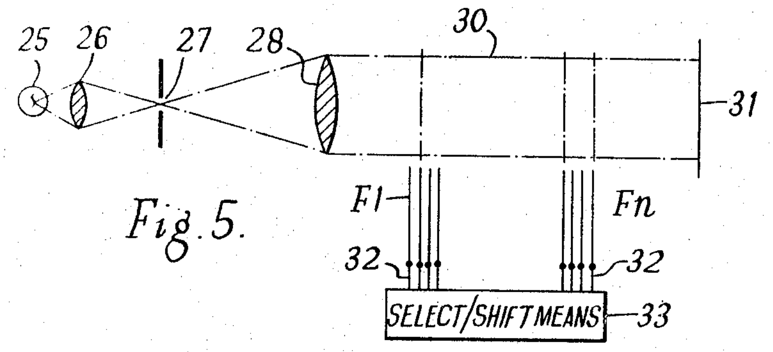
FIGURE 5 is a largely schematic diagram showing one simple form of means for performing the matching operations necessary to produce the different character description matrix layers as shown in FIG. 3.

One simple form of the means 23 for performing the required different matching operations in the production of the CD matrix layers $\alpha$, $\beta$, . . . $\omega$ is shown in FIG. 5, in which a light source 25, a condensing lens system 26 and a pinhole aperture 27 serve to provide a point light source for the formation by way of a collimating lens 28 of a parallel light beam 30 directed towards a photographic film or plate layer 31. The various ID matrix image layers F1, F2 . . . F*n*, preferably including both positive and negative versions of each are arranged stackwise below the beam 30, each carried by a support member 32 by which the layer concerned may be moved to a desired position within the beam. The movement of each support member 32 is controlled by means 33 which may consist of a series of appropriately contoured cams on a common control shaft, the profiles of the individual cams being so designed that the various different combinations of the layers F1, F2 . . . F*n* are displaced to the required relative positions within the beam 30 in turn as necessary to perform a complete operation cycle in steps, each step being that involving production of a different one of the CD image layers $\alpha, \beta \ldots \omega$.

Each CD image layers $\alpha, \beta, \gamma \ldots \omega$ is accordingly related to a particular one of the characters in the range of characters capable of being identified and by examining such layers either collectively or successively with a scanning motion parallel to the direction of the initial character group 10 each character may be identified in turn. This may be effected as shown in FIG. 1 by projecting, with the aid of means indicated schematically by the arrow 34, each layer $\alpha, \beta, \gamma \ldots \omega$ on to a separate strip of an output matrix 35 through a decision aperture 36 in an opaque sheet or plate which is moved parallel with the strip direction as indicated by the arrow *s*. The width of the aperture 36 determines the horizontal extent of each layer $\alpha, \beta, \ldots \omega$ of the CD matrix 24 to be included at any time during the scanning operation and is determined by the maximum scatter of the entries recorded on any matrix layer judged to be allowable or likely to occur. The resultant entries in the different strip-sections of the output matrix 35 identify each character by the vertical level in which it occurs in the output matrix and its position within the original group 10 by its position along each horizontal level.

The means 34 may take a variety of different forms. One simple form is similar to the arrangement already described with reference to FIG. 5 with the supports 32 each carrying a different one of the CD image layers $\alpha, \beta \ldots$ and being arranged to move such image layers into the beam 30 in turn as a recording photographic film or plate 31 is moved upwardly by the control means 33 in step by step manner to present, at each step, a different one of the horizontal levels of the output matrix 35, FIG. 1. Suitable light obscuring shutter mechanism, also controlled by the means 33 is, of course, included while the member carrying the decision aperture 36 is also controlled by the means 33 to execute a horizontal scanning movement during each step, the return movement of such aperture member being controlled, e.g. by a suitable cam, to take place while the layers $\alpha, \beta \ldots$ are being changed and while the photographic film 31 which is to form the output matrix 35 is being moved up one step and is obscured by its associated shutter.

The position and the extent of each registration on the image layers of the I.D. matrix 22 will clearly vary quite considerably in accordance with the particular form of the character under examination such as its type style and the quality of the printed or written character and it is of advantage, when making the recording on each matrix layer, to blur the image somewhat so that it covers a greater area and with less sharply defined limits thereby to facilitate the subsequent comparison of such image with those of other image layers of the matrix in the second comparison of matching operation. Variation in the detail of similar features of characters in different styles are best accommodated by suitable modification of the comparison or matching operations such as by imparting a limited degree of rocking or other movement to the different displaced images.

Figure 6:
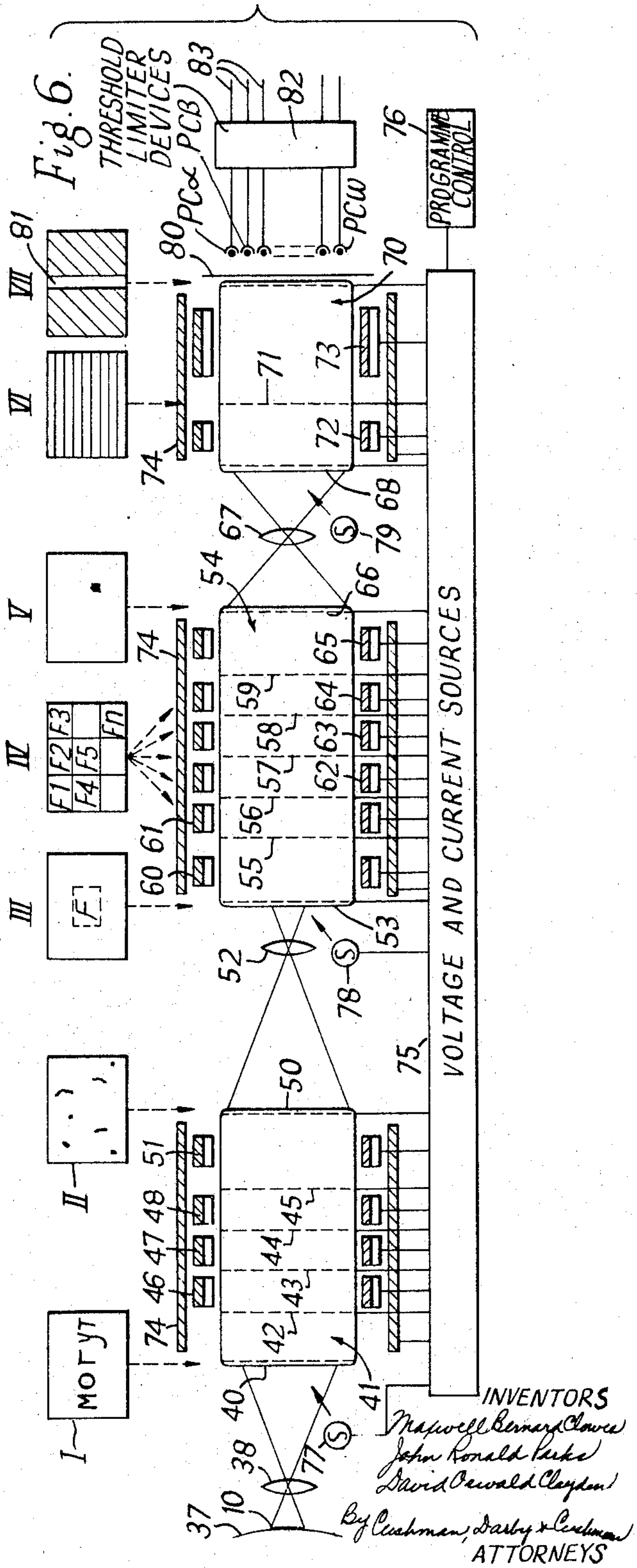
FIGURE 6 is a diagram, partly of block schematic form, illustrating one arrangement embodying the invention and using electron-optical devices.

The above described wholly optical system is clearly one which is of limited practical value in view of the time needed to provide the different result registrations in the matrix layers in a form suitable for their subsequent re-use. As an alternative to such purely optical arrangements use may be made of an electron-optical arrangement employing devices of the general form described in the aforementioned application Serial No. 327,196. One arrangement of this type is illustrated in FIG. 6 where the image of a character or, more preferably, of a group of characters 10, conveniently on a sheet or strip supported by a roller 37 forming part of an input feed means, is focused by an optical system 38 on to the photocathode surface 40 of an electron optical image storage tube 41 having a plurality of separate and axially spaced storage planes equal in number to the chosen number of different auto-correlation images required as in the optical embodiment of FIG. 1. For ease of description and simplicity of the drawing only four storage planes 42, 43, 44, 45 are shown. As described in the aforesaid co-pending application Serial No. 327,196, the tube 41 is also provided with sets of beam deflection coils 46, 47, 48 between each storage plane for the purpose of controlling deflection of the tube beam in different angular directions relative to the tube axis. The tube 41, instead of the single conductive output electrode referred to in the aforementioned application, is provided with a visual output means in the form of a phosphor layer 50 on to different areas of which the tube beam, after passage through the storage planes 42 . . . 45, may be directed by the further set of deflection coils 51 to produce visual images representing the result of the particular self matching operation being performed at any time. This image is then projected through an optical system 52, with some considerable reduction of size and, preferably, also with some reduction in resolution, on to the photocathode electrode 53 of a second electron optical image storage tube 54, broadly similar to the first tube 41. This tube 54 likewise contains a plurality of spaced storage planes conveniently equal in number to the chosen number of different CD matrix layers $\alpha, \beta \ldots \omega$ in the optical embodiment of FIG. 1. Again for ease of description and simplicity of the drawing only five of such planes 55, 56, 57, 58 and 59 are shown. This tube 54 is provided with sets of beam deflection coils 60, 61, 62, 63, 64 and 65 for steering the electron beam through the tube as will be described later. Like the first tube 41 this tube 54 provides a visual output upon a phosphor layer 66 at the end opposite to the photocathode 53.

The visual output image on the phosphor layer 66 of this tube is then projected by an optical system 67 on to the photocathode 68 of a third electron optical image storage tube 70 which, although similar to the other tubes, has only a single storage plane 71. This tube is provided with a set of beam deflecting coils 72 operative between the photocathode 68 and the storage plane 71 and with a further set of beam deflecting coils 73 between such storage plane 71 and a phosphor layer 74 upon which a visual output image is produced.

As described in detail in the aforesaid application Serial No. 327,196 each of the storage planes 42–45, 55–59 and 70 comprise a group of elements consisting of a central dielectric storage mesh flanked on the photocathode side by a conductive field mesh and on the opposite side by a further field mesh while in between each mesh group and between the photocathode and the first mesh group is provided an anode or collector ring electrode (not shown in the present drawings). Each set of deflection coils 46–48, 51, 60–65 and 72, 73 comprises two separate pairs of coil windings adapted respectively when suitably energised to cause deflection of the tube beam in the conventional X and Y direction perpendicular to one another after the style of normal C.R.T. deflection coils. Each tube is additionally surrounded by an elongated solenoid winding as indicated at 74 for focusing the respective tube beams.

In the operation of the various storage tubes suitable currents and potentials need to be applied to the different elements of each storage mesh group, to the various deflection coils and to the focussing coils and, for simplicity of illustration in the present instance, these are shown symbolically by the single block 75, it being understood that this symbol indicates collectively the equivalents of the potential sources 30, 130, the deflector current sources 33, 133, the focus current sources 32, 132, and the intensity adjusting and switch means 34, 35, 134, 135 of the arrangements of the aforesaid applications Serial No. 327,196 as well as the various other switch means for performing the various successive steps of the complete operation cycle under the overall control of a programme controller 76 which is the equivalent of the programme controller 36 of the aforesaid application. As in the said application Serial No. 327,196 separate illumination sources 77, 78 and 79 are provided adjacent the photocathodes 40, 53 and 68 for flood illuminating such cathodes in the manner as described in such application. Such sources are supplied from sources included within the supply source 75 through switch means equivalent to those indicated at 38, 138 in the aforesaid application Serial No. 327,196.

In the operation of this arrangement the image of the character group 10 focused on the photocathode 40 (see diagram I) of the first tube 41 is first stored (as either a "positive" or "negative" charge pattern as required and as described in the aforesaid application) in each of the storage planes 42, 43, 44, 45 of the tube. When the planes are charged the input character image is removed from the photocathode 40 and, after adjustment of the operation potential to hold each storage plane charged and to prevent any further storage in such planes, the photocathode 40 is then flood illuminated by the light source 77 to provide a uniform electron flood beam which passes along the tube and is modulated as it penetrates each storage plane due to the local potential at the different points thereof so that the image formed on the output phosphor layer 50 is the product of the beam transmission through each storage plane in turn. By deflecting the trajectory of the beam as it passes between the different storage planes any desired comparison or self-matching operation can be performed. The output image on the phosphor layer 50 (see diagram II) is accordingly the equivalent of one layer of the I.D. matrix 22 in the arrangement of FIG. 1.

This optical image, depicting the result of one self-matching operation, is then projected on to the photocathode 53 of the tube 54 with reduction in size and preferably some degree of blurring by defocusing (see diagram III) for similar storage in each of the storage planes 55, 56, 57, 58, 59 but with direction by means of the first set of deflection coils 60 into a particular discrete area thereof as indicated at F1, F2 . . . F*n* in diagram IV. The number of storage areas F1 . . . F*n* employed is equal to the number of different self-matching operations performed on any one character or group of characters.

The above described operations with the first and second tubes 41, 54 are then repeated with appropriate changes in the deflection waveforms applied to each tube to perform all of the chosen series of comparison or self matching operations, each resulting image produced on the output phosphor layer 50 of tube 41 being directed, by appropriate energisation of the deflector deflection coils 60, into a different one of the areas F1 . . . F*n* of the planes 55–59 of the tube 54. Thus the images eventually stored in each of the storage planes 55–59 of the tube 54 correspond to the CD matrix of FIG. 1. When storage of the results from all of the different first self-matching operations has been completed, the operating potentials of the tube 54 are adjusted to hold the charges on the various storage planes and to prevent any further storage thereon. The photocathode 53 of the tube 54 is then flood illuminated by the source 78 and in a manner similar to that already described with regard to the tube 41 using appropriate control of the beam deflection between successive planes 55–59 a series of further comparison or matching operations between different areas F1 . . . F*n* of the storage planes in the tube 54 may be effected with production of the resultant output image on the phosphor layer 66 of the tube (see diagram V). The active area of the phosphor layer 66 is preferably restricted to a single central zone conforming in size and shape to one of the unit areas F1, F2 . . . F*n*, the beam portion passing through the chosen sequence of the areas F1 . . . F*n* being directed to such central area by suitable control of the deflection currents supplied to the deflection coils 65. An opaque mask with a restricted opening may be provided adjacent the phosphor layer 66. In another alternative the flood illumination by the source 78 may be restricted to a similar area on the photocathode 53.

Each output image on the phosphor layer 66, as it is produced, is projected through the optical system 67 on to the photocathode 68 of the third tube 70 and, by means of the deflection coils 72, the resultant tube beam is directed into a particular related area of the single storage plane 71 (see diagram VI). Conveniently these areas are constituted by horizontal strips each corresponding to a different one of the character series.

After repeated operation of all of the different forms of comparison or matching of different combinations of the areas F1 . . . F*n* of the tube 54 with direction of the results into different areas of the storage plane 71 in the tube 70, the potentials of such third tube are re-adjusted and the photocathode 68 flood illuminated by the light source 79. By means of the deflection coils 73 the complete stored image then present on the storage plane 71 is swept horizontally across the output phosphor layer 74 which is flanked externally by a mask 80 having a vertical slit as shown at 81 in diagram VII and beyond which is a vertical row of photo cells PC$\alpha$, PC$\beta$ . . . PC$\omega$, one for each horizontal strip of the plane 71 so that, as any recorded signal area in any one of the horizontal strips of the storage plane is swept along the phosphor and passes the aforesaid slit, its light output is effective upon the related photocell. The respective cell outputs are applied through suitable threshold clamp circuit means 82 to separate character signal leads 83. The output of each photocell, if above a chosen threshold value, causes energisation of its related lead to identify the respective characters of the group 10 in turn. The outputs in the leads 83 may each control the operation of suitable utilisation means such as input mechanism of a computer or data handling apparatus.

Figure 7:
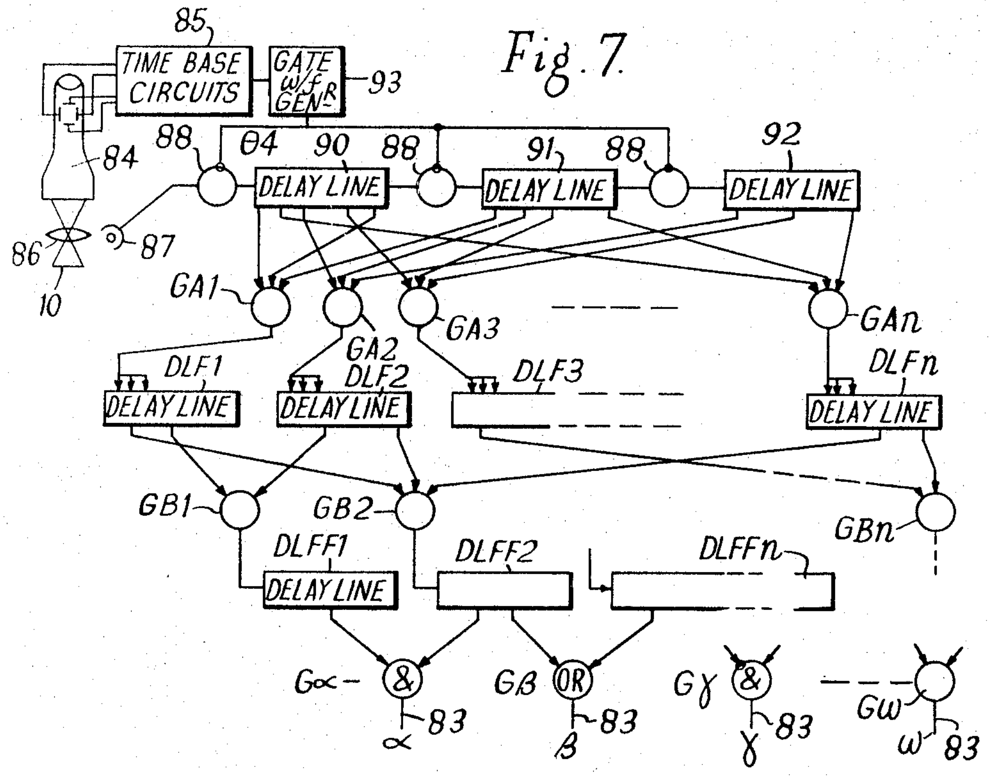
FIGURE 7 is a block schematic diagram illustrating another embodiment of the invention utilising a raster scanning process and employing electric signal delay lines for the requisite matching operations.

Another alternative system is illustrated in FIG. 7 and employs examination of the object character or character group 10 by means of a flying spot scanning system provided by a cathode ray tube 84 whose beam movement is controlled by time base circuits 85 to provide a raster-like scan of a focussed light spot on the tube screen. Such raster scan is projected on to the area including the character group 10 by means of an optical system 86.

Figure 11:
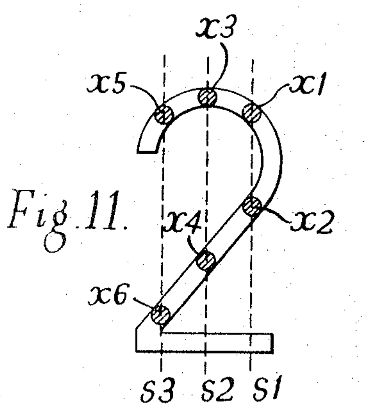
FIGS. 11, 12 and 13 are explanatory diagrams.

Referring to FIG. 11, the numeral "2" is shown as scanned by a flying light spot moving over the three successive and parallel rectilinear paths or lines $s1$, $s2$, and $s3$ with the usual, more rapid flyback (not shown) between the respective line scans. With the aid of suitable photoelectric sensing means a discernable signal output can be obtained upon the passage of the moving light spot over the different parts of the character which coincide with points on the different line scans as indicated by points $x1$ and $x2$ on the first scan $s1$, points $x3$ and $x4$ on the second scan $s2$ and the points $x5$ and $x6$ on the third scan $s3$. If the signal due to the scanning of point $x1$ is delayed by a chosen time interval so that it coincides in time with the signal due to the scanning of point $x5$, and if the signal due to the scanning of point $x3$ is also delayed by a time interval such that it also coincides in time with the signal resulting from the scanning of point $x5$, the combination of these three signals, as by multiplying them together, can be arranged to provide a substantial amplitude output only when the raster scan is effected upon a character having a curved region such as that of the upper part of the numeral "2" as shown. In similar manner, if the signal due to the scanning of point $x2$ is delayed with respect to the signal due to the scanning of point $x6$ so that the two coincide in time and if the signal due to the scanning of point $x4$ is likewise so delayed in time that it coincides also with the signal due to the scanning of point $x6$, then the combination of these three signals, as by multiplying them together, will likewise provide a substantial amplitude output only when the character being scanned has a rectilinear and inclined region such as shown for the inclined middle limb portion of the numeral "2." Any other geometrical shape can be dealt with in like manner by appropriate alteration of the respective delay times.

Clearly by further simple extension of the principle other colinear and non-colinear displacements of any orientation defining different characteristically shaped portions of a character may be identified in like manner. For example, a vertical linear element may be identified by multiplying together a number of scan output signals which are only slightly delayed relative to one another and which will provide a significant output when multiplied together only when the scanning light spot path coincides with the linear direction of the said vertical linear element during the time of one scan line.

The output signals resulting from the combination of differently delayed and undelayed signals as described above clearly form the equivalents of the different I.D. matrix layers F1, F2 . . . F$n$ of the optical arrangement of FIG. 1 and as shown by way of example in FIG. 2.

The arrangement has the advantage that, as it is the relative delay of the separately multiplied signals, each obtained during the raster-like scan period, which determines their ultimate effect in producing a recognition output signal, the actual position of the character within the scanned area is relatively unimportant if the said raster-like pattern is repeated a suitable number of times each with a progressive shift so as to illuminate substantially the whole of the area within which the character may be expected to be located.

Figure 12:
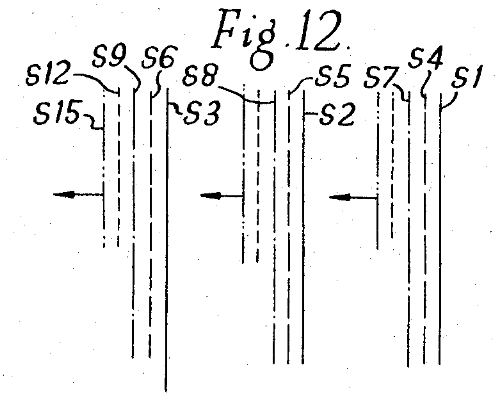

One particular form of scanning cycle is illustrated in FIG. 12 in which the first three-line scan group of lines $s1$, $s2$ and $s3$ is followed by a second scan line group of lines $s4$, $s5$ and $s6$ slightly displaced leftwards respectively from lines $s1$, $s2$ and $s3$, the third three-line scan group of lines $s7$, $s8$ and $s9$ being similarly still further slightly displaced horizontally so that line $s7$ lies adjacent line $s4$, line $s8$ adjacent line $s5$ and line $s9$ adjacent line $s6$ with corresponding displacement of the further scan groups to complete the coverage of the character area.

The use of a three-line scan group has been described by way of example but is clearly not essential. Any desired number of successive scans may be employed to form each spaced scan-line group, the greater the number, the greater the amount of information made available for recognition. Three lines, however, represents a practical number for most applications in view of the electrical time delay and band-width problems involved.

The provision of the various separate and differently delayed versions of the signal obtained during scanning is achieved by applying such signal to a suitable delay line or delay network having a number of appropriately located tapping points and then using the signals simultaneously available at such tapping points or at an appropriate selection of such points for application to a suitable multiplier circuit.

The signal delay means may be of any convenient form but a particularly suitable component is a low unit delay distributed delay cable such as that available as Hackethall cable type HH 1500 or HH 2000. In such cables the magnetic field of the core conductor can be detected outside the cable body and may be sensed by means of a short inductance coil around the outer sheath of the cable. Such coil can be adjusted in position (and hence in its delay point tapping) merely by sliding it along the cable.

Reverting now to FIG. 7, in the arrangement shown the signals from a photo multiplier tube 87, directed to receive light reflected from the object area as it is illuminated by the flying spot from the C.R.T. 84, are fed to a serial arrangement of three delay lines 90, 91 and 92, each of which has a delay time equal to the period of one line scan. Intermediate controlling gates 88 are supplied with control waveforms from a source 93 which is of any suitable form such as a trigger circuit arrangement synchronised by the time base circuits 85 and which provides waveforms adapted to close the various gates for at least a one scan line period at the end of each three-line scan cycle whereby the signals then present in the three delay lines correspond respectively to the third, second and first scan lines of each three line group.

Figure 13:
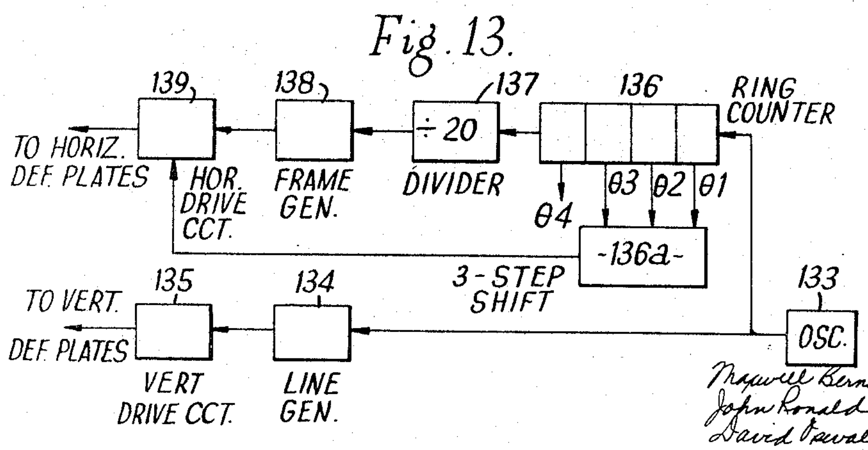

FIG. 13 shows one form of the time base circuits 85 and gate control waveform source 93. In such arrangements, the appropriate motion of the C.R.T. beam necessary to cause the light spot to execute the desired scanning path pattern is effected by electrostatic deflection with deflection voltages derived from an oscillator 133 operating at the line frequency $f_L$. The output of the oscillator 133 is applied to a line scan generator 134 for generating the requisite sawtooth waveform and this in turn feeds a vertical drive amplifier 135 energising the vertical beam deflection plates of the tube 84. The output of the oscillator 133 is also applied as the input of a four stage ring divider circuit 136 whose output at frequency $f_L/4$ is then fed to a further frequency divider circuit 137 having a divide factor of 20. The output of the latter, at the frequency $f_L/80$, is used to operate a frame scan generator 138 for generating a suitable sawtooth waveform which, through a horizontal drive circuit 139, energises the horizontal beam deflection plates of the tube 84. To provide the interleaved pattern of three successive and relatively widely spaced line scans in each scan line group, the outputs from each of the first three stages of the ring divider circuit 136 are applied to a three-step waveform generator **136*a* which provides a three-step waveform output which is used in the horizontal drive circuit 139 to impose the requisite horizontal shift between the three sucessive line scans of each group. The control waveform $\theta 4$ for closing the gates 88 is derived from the fourth stage of the ring divider circuit 136**.

A number of differently delayed versions of the signals passing through such delay lines, chosen to pick out the different character features as already described with reference to FIGS. 11 and 12, are then supplied as inputs to signal comparison devices GA1, GA2 . . . GA$n$ (FIG. 7) which, with the analogue form of system being described, effectively operate as multipliers. The outputs from such devices are then fed each to a further associated delay line DLF1, DLF2, DLF3 . . . DLF$n$ each capable of storing at least the number of line scans by the C.R.T 84 in a frame scan whose width is adequate to cover the widest character to be examined. These delay lines DLF1, DLF2 . . . DLF$n$ are of low bandwith and are preferably fed with the same input signal at each of a plurality of input points which are separated from one another by delay time amounts equal to the line scan period for the purpose of slightly blurring the resultant output signals. Such delay lines constitute the equivalent of the I.D. matrix 22 of FIG. 1. The outputs from a number of different tapping points on this series of delay lines are then examined in further multiplier type devices GB1, GB2 . . . GB$n$ and the outputs therefrom are fed to further delay lines DLFF1, DLFF2 . . . DLFF$n$, each having a delay time equal to the total frame scan period of the C.R.T. 84.

Different combinations of outputs taken from chosen tapping points on these lines serve as inputs to a number of gate circuits G$\alpha$, G$\beta$, G$\gamma$ . . . G$\omega$ which, according to the type of second comparison or matching operation to be performed, may be of the AND, OR or other different forms to provide final outputs which identify the different characters on the character signal leads 83.

While the above-described arrangements have been described for operation upon an analogue basis, it is possible to convert the signals from the devices GA1 . . . to binary form in which the signal is of zero amplitude when the signal from said devices is below a chosen threshold level and is of a chosen fixed value when such signal is above such threshold level, whereupon the subsequent devices GB1 . . . may be simple coincidence gates.

Figure 8:
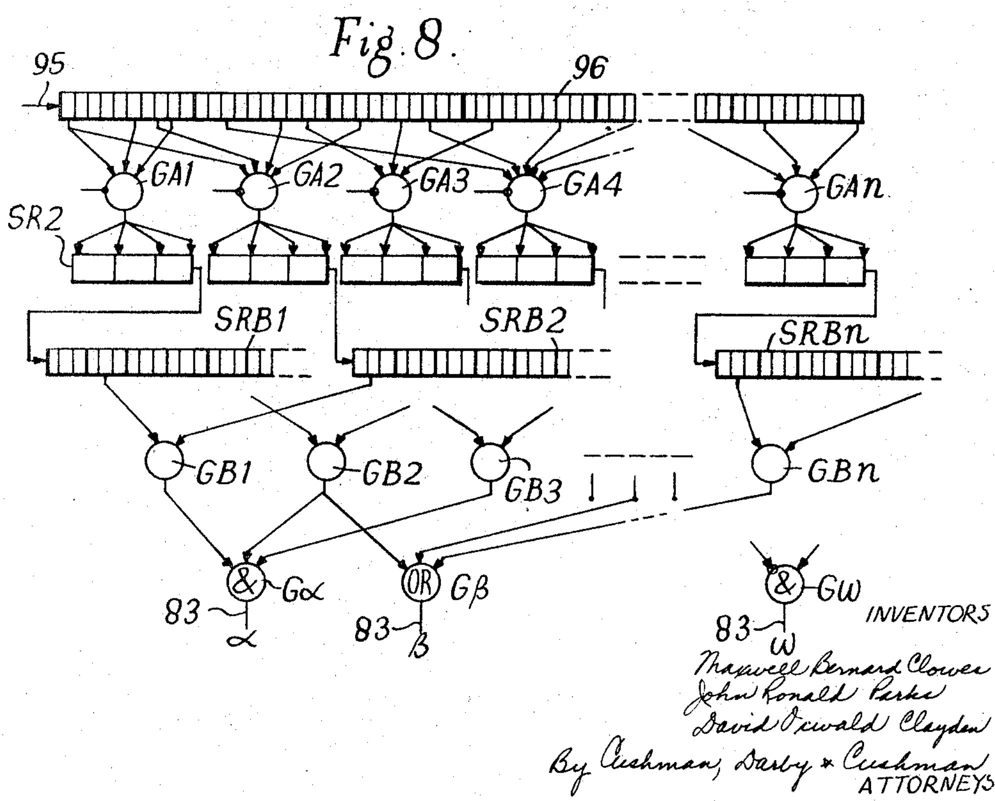
FIGURE 8 is a further block schematic diagram illustrating a modification of the general arrangement shown in FIG. 7 and utilising binary signal shift registers.

Another alternative system, broadly similar to that of FIG. 7 but operating upon a binary instead of an analogue basis is shown in FIG. 8 where the signals from the scanner or equivalent means, after conversion to binary form by suitable amplitude gating, are applied by way of lead 95 as input pulses to an extended shift register 96 of a total length sufficient to register all of the binary form signals occurring in one complete frame scan by the C.R.T. 84. Outputs from different elements of this shift register are compared in the various AND gates GA1, GA2 . . . GA*n* to provide a series of outputs each of which is then fed simultaneously to the start of each of several line-length shift registers serially connected to effect the equivalent of the blurring already referred to in connection with the embodiment of FIG. 1. The output from each of these registers is then applied to an associated one of a further series of frame-length shift registers SRB1, SRB2 . . . SRB*n* forming the equivalent of the I.D. matrix 22 (FIG. 1). Outputs from different elements of this series of registers are then combined by means of the various coincidence gates GB1, GB2 . . . GB*n* to provide further outputs corresponding to the different cells of the C.D. matrix (FIG. 1) and these are examined in different combinations with the aid of the AND, OR gates and like devices shown at G$\alpha$, G$\beta$ . . . G$\omega$ and which form the equivalent of the decision aperture 36 in FIG. 1. As in the embodiment of FIG. 7, these gate devices may be of different forms and the respective outputs constitute the character identifying signal leads 83. It may be desirable to include a multiple input delay line resembling those of the series DLF . . . in FIG. 7, or a low pass filter in the outputs from the gates GB1, GB2 . . . GB*n* in FIG. 8 in order to introduce the effect of some further blurring of the exact location of the product signals relative to the character scan.

As an alternative to the use of a large number of shift registers, called for by the arrangement shown in FIG. 8, use may be made of magnetic drum storage practice. The signals arising from a complete character group may be stored on a single storage track of such a drum and pick-off heads positioned around the drum at points corresponding to a particular sampling combination or matching scheme. By using a number of separate drum tracks with different head position relationships, any desired number of different comparison or matching functions may be obtained. Similar use may obviously be made of magnetic drum systems for the other storage arrangements. In another alternative, a drum may be used for storing only the I.D. matrix signals and subsequent information while the intial or character-representing signals storage is provided by a magneto-strictive delay line provided with multiple pick-off points. The desirable blurring operation may be effected by means of magneto-strictive or L.C. delay lines of low band width and capable of storing several scan lines.

Figure 9:
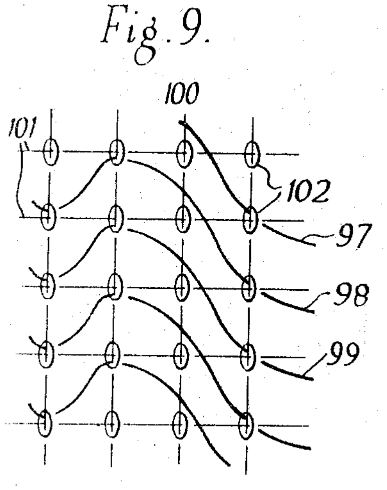
Figure 10:
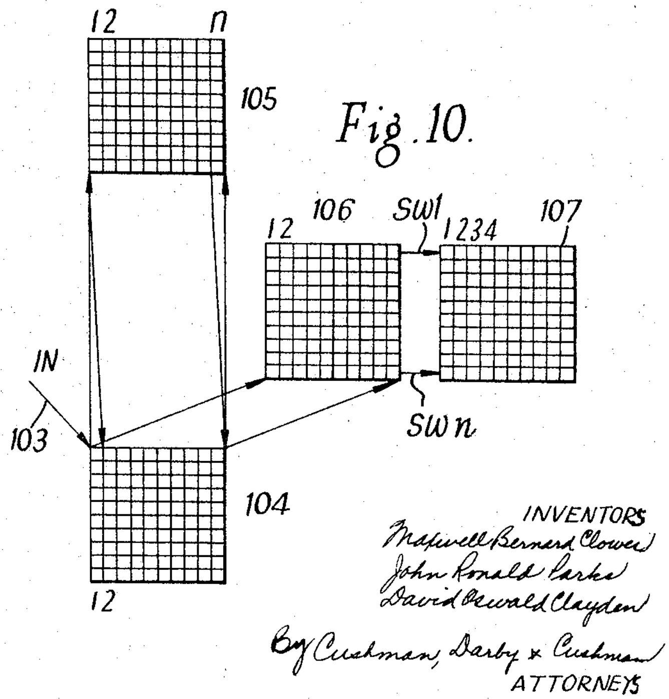

In yet another alternative arrangement, the various binary-form signals are stored in a magnetic core storage or like device. Thus, in FIG. 9, each line scan signal may be registered in one column of a core plane 100 whose rows 101 equal the number of scans in a frame. Such core plane is then threaded with sense wires as shown at 97, 98 and 99 in FIG. 9 whose paths between the cores 102 of different rows of the matrix define some particular character feature and so that upon reading out all of the cores in the core plane 100 simultaneously by the usual means of the computer art, the signal on each of the sense wires will be proportional ot the number of cores switching along its length and if these outputs exceed a certain specified threshold value the resultant signal will indicate that the plane involved contained stored signals in most of the threaded cores and thus will indicate the presence of the particular feature determined by the arrangement of the sense wire. Each feature sought must be provided for by an individual sense wire in all possible positions of the core plane and in order to reduce the resultant complexity it is preferably arranged so that the core plane is interrogated between each line scan with the image signals of each line indexed one column across the plane at each cycle, the next following new line being fed to the first column thus made vacant each time. By this means the feature sought may need only be wired in all vertical positions. Such a scheme is illustrated in FIG. 10 where signals from the phototube associated with the scanner are converted to binary form in gating means and are fed at 103 into column 1 of a first core plane 104. At the end of the scan, all signals in this first core plane 104 are transferred, core-for-core, to each of second and third core planes 105 and 106, core plane 104 being cleared in the process. Next the contents of core plane 105 are transferred back to core plane 104 but with a right shift by one column so that column 1 of the core plane 105 returns to column 2 of core plane 104 and so on. At the same time, core plane 106, which has been wired to detect the required different character features as already described with relation to FIG. 9, has all cores switched simultaneously. The respective sense wire outputs are stored in column 1 of a related further core plane CP4$\alpha$, CP4$\beta$ . . . CP4$\omega$. The operation is then repeated for each following line scan of the scanner C.R.T. 84 with the sense wire outputs from core plane 106 stored in successive columns 2, 3, 4 . . . of the related core planes CP4$\alpha$ . . . .

The speed of operation of an arrangement as shown in FIG. 10 can be doubled by the provision of additional switching means which allow transfer from either core plane 104 or 105 to fill the core plane 106 with the input on lead 85 simultaneously directed to the other of the two planes 104, 105. There will be a one column right shift during each transfer between the core planes 104 and 105 whichever way it occurs.

We claim:

1. Apparatus for recognising printed or hand written characters or groups of characters which comprises means for effecting a series of self-matching operations on each character or group of characters using identical images of said character or said group of characters as examining character images with different forms of relative displacement of the examining character images with respect to the said character or group of characters in each operation to determine the presence or absence of different specific character features in said character or in each of the characters of said group of characters, means for separately registering the results of each of said separate feature-determining operations and means for effecting a series of matching operations between different combinations of said feature determining result registrations to determine the presence or absence of different specific feature combinations each unique to a different one of the range of characters capable of being recognised.

2. Apparatus according to claim 1 which includes means for separately registering the results of said feature-combination matching operations and means for selectively examining each of said feature-combination registrations to determine those which contain a response registration in excess of a predetermined threshold value.

3. Apparatus according to claim 2 in which each of said means for effecting said series of self-matching operations and said series of matching operations operate optically.

4. Apparatus according to claim 3, in which each of said means for registering each result of an operation by said self-matching means and by said matching means operate photographically.

5. Apparatus according to claim 2 which comprises at least one electron optical image storage tube having an input photocathode, a plurality of spaced charge storage planes and an output phosphor layer, means for optically projecting a light image on said photocathode, means for steering the resultant electron beam through different non-aligned areas of said storage planes in turn and means for supplying operating potentials to said charge storage planes first to cause localised charging of said planes in accordance with the cross-section of the impniging electron beam and then to cause holding of the charges on said storage planes to modulate an impinging electron beam in accordance therewith.

6. Apparatus according to claim 2 which includes light spot scanning means for illuminating the said character or character group with a raster-like pattern of spaced parallel lines, photoelectric means directed to receive light from the area illuminated by said scanning means to produce an electric signal representing the said character or character group, first electric signal delay means arranged to be supplied with said electric signal and having a plurality of output signal tappings providing delays of different values chosen to provide signals representing said character or character group with said different forms of displacement relative to said character or character group and a plurality of separate signal combining means for combining in a multiplicative sense signals from at least two of said signal tappings to produce signals representing the degree of presence of different specific character features in said object character or character group.

7. Apparatus according to claim 6 which includes a plurality of second electric signal delay means each arranged to be supplied with the output signals from a different one of said signal combining means, said second signal delay means each having output signal tappings providing delays of chosen different values, a plurality of separate second signal combining means for combining in a multiplicative sense signals from signal tappings on at least two different ones of said second delay means, a plurality of third electric signal delay means each arranged to be supplied with the output signals from a different one of said second signal combining means and each having at least one output signal tapping providing a delay of chosen value and a plurality of separate third signal combining means for combining signals from output signal tappings on at least two different ones of said third signal delay means to form character identification signals.

8. Apparatus according to claim 7 in which said light spot scanning means comprises a cathode ray tube and associated line and frame time base circuits and an optical system for projecting the raster pattern traced by the tube beam on the tube screen on to the area of said object character or character group.

9. Apparatus according to claim 8 in which said signal delay means comprise tapped electric signal delay lines.

10. Apparatus according to claim 8 in which said signal delay means comprise multi-stage shift registers.

11. Apparatus according to claim 8 in which said signal delay means comprise a magnetic storage drum having a plurality of spatially separated pick-off heads.

12. Apparatus according to claim 8 in which said signal delay means comprise a matrix of hysteresis type storage elements.

13. Apparatus according to claim 8 for recognising each of the characters of a group of characters in which said means for selectively examining each of said feature combination registrations comprises means for selectively examining in turn different parts of said feature combination registrations, said parts being of a limited extent not greater than that required to register the feature combination response for one character only of said group of characters thereby to identify the characters of said group individually in the order in which they occur in said group.

14. Apparatus according to claim 7 which comprises means for reducing the resolution of the registered results of each of said separate feature-determining operations thereby to provide a degree of generalisation of the position of the determined feature in said character or group of characters.

References Cited by the Examiner

UNITED STATES PATENTS

| | | | |
|---|---|---|---|
| 3,195,396 | 7/1965 | Horwitz et al. | 88—1 |
| 3,196,392 | 7/1965 | Horwitz et al. | 340—146.3 |
| 3,196,395 | 7/1965 | Clowes et al. | 340—146.3 |

MAYNARD R. WILBUR, *Primary Examiner.*

J. I. SCHNEIDER, *Assistant Examiner.*